Apr. 24, 1923.
A. J. DREMEL
1,452,730
MOTOR DRIVEN LAWN MOWER
Filed Nov. 1, 1920
3 Sheets-Sheet 2
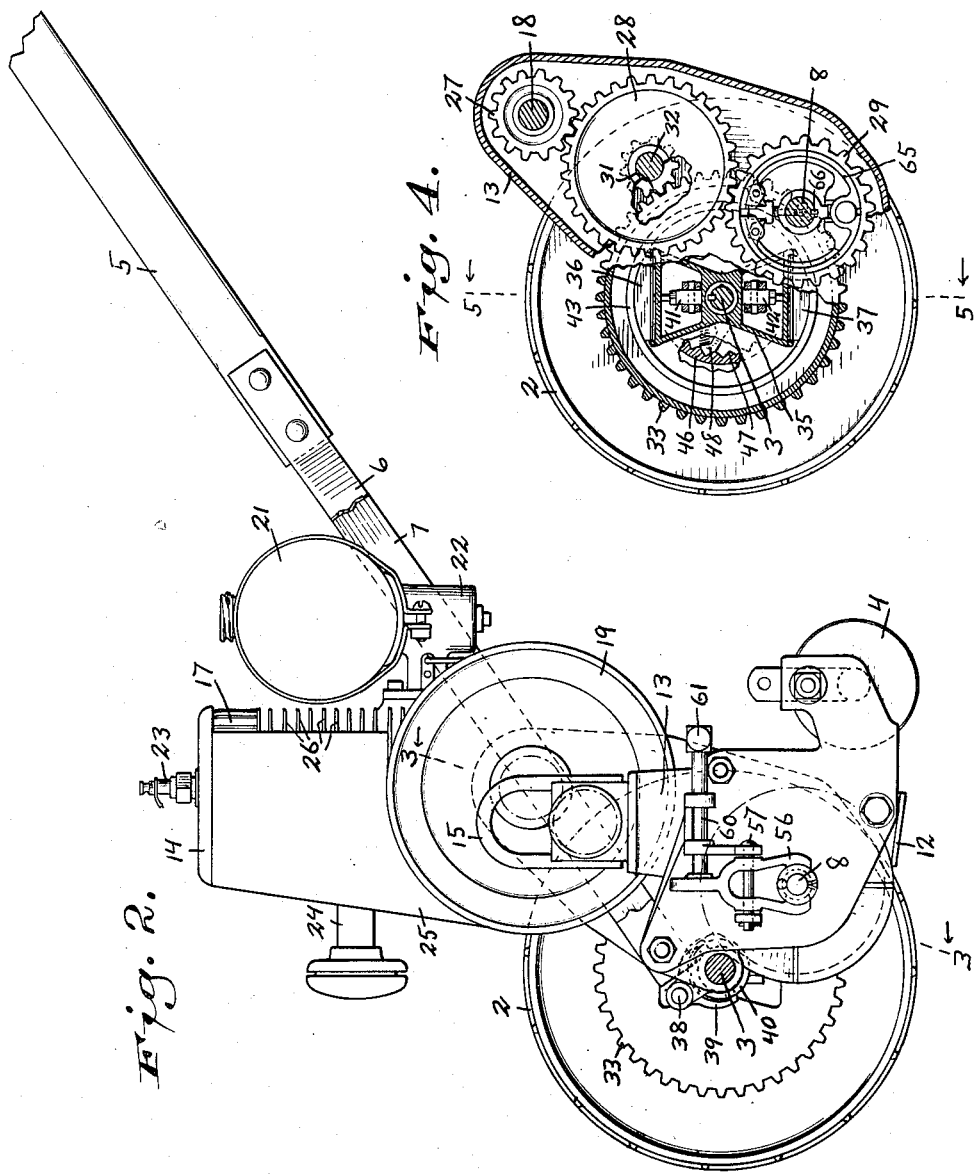
Albert J. Dremel
INVENTOR.
BY
Bottum, Bottum, Hudnall & Becher
ATTORNEYS.

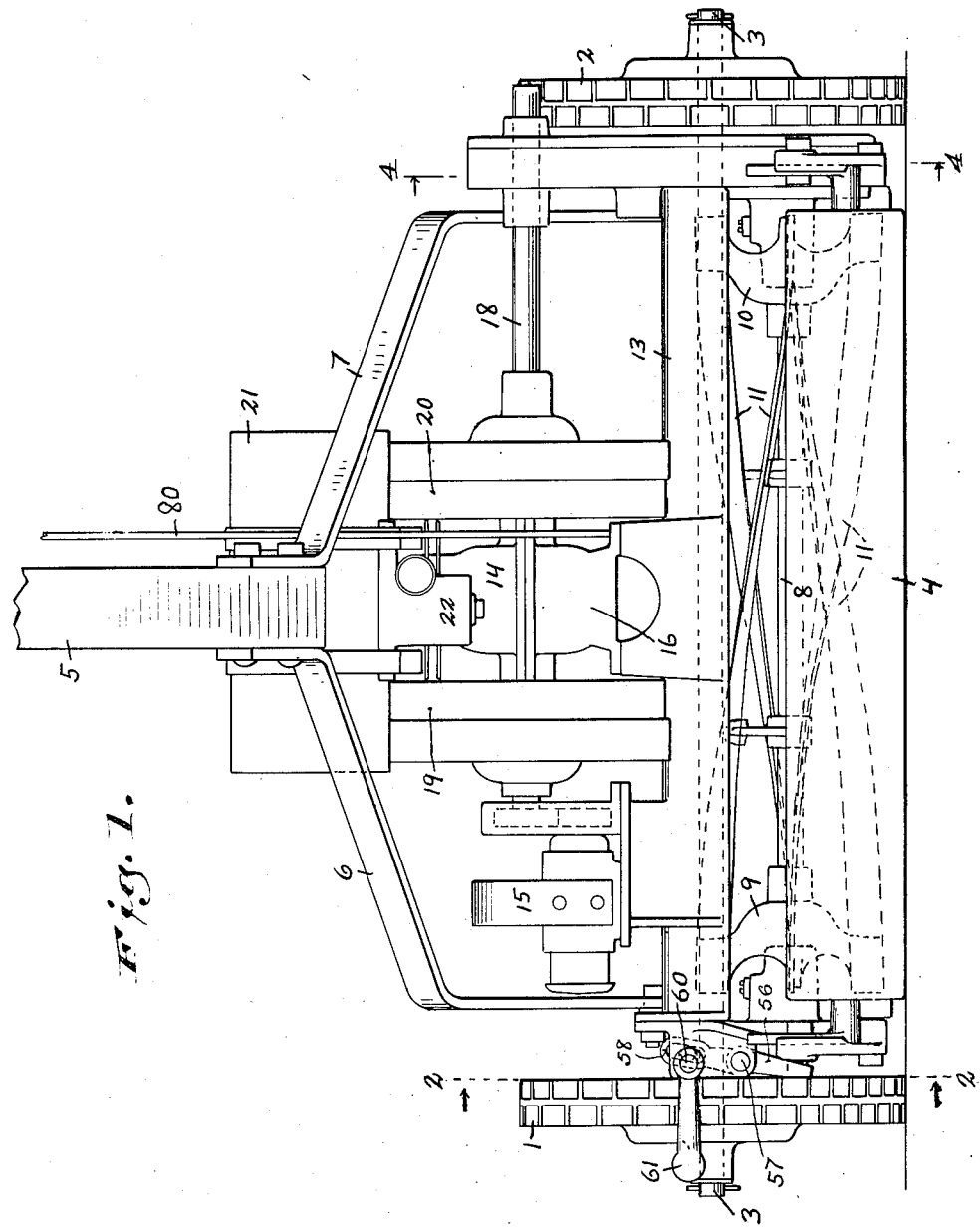

Apr. 24, 1923.
A. J. DREMEL
1,452,730
MOTOR DRIVEN LAWN MOWER
Filed Nov. 1, 1920   3 Sheets-Sheet 3
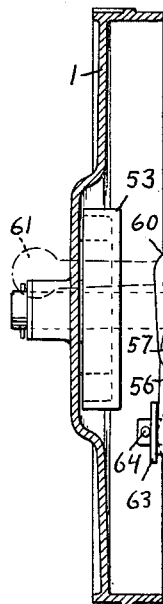
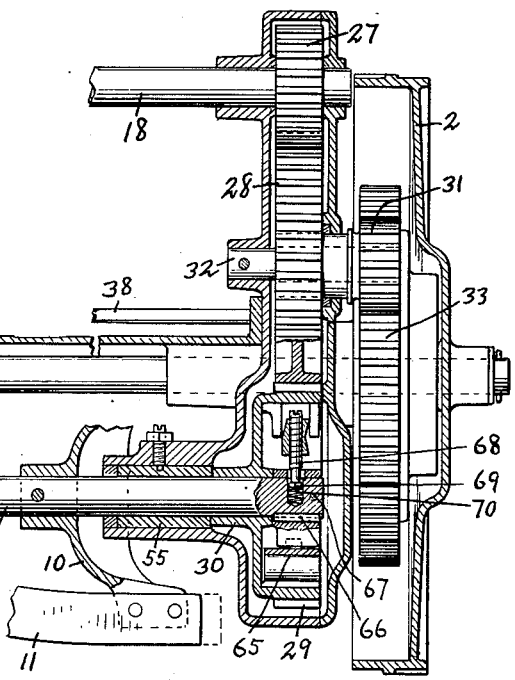
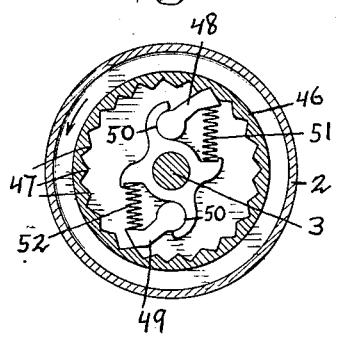
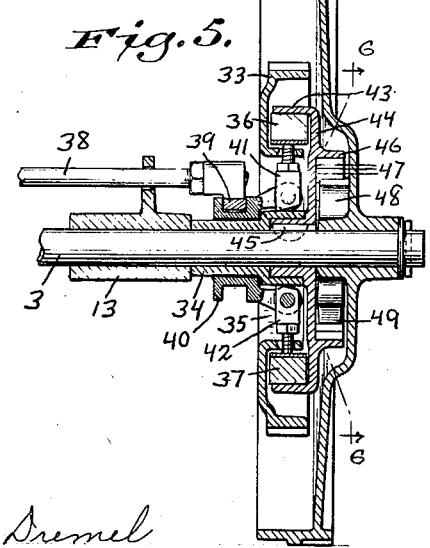
INVENTOR.
Albert J. Dremel
BY
Bottum, Bottum, Hudnall & Pecher
ATTORNEYS.

Patented Apr. 24, 1923.

1,452,730

UNITED STATES PATENT OFFICE.

ALBERT J. DREMEL, OF RACINE, WISCONSIN.

MOTOR-DRIVEN LAWN MOWER.

Application filed November 1, 1920. Serial No. 421,106.

*To all whom it may concern:*

Be it known that I, ALBERT J. DREMEL, a citizen of the United States, residing at Racine, in the county of Racine and State of Wisconsin, have invented certain new and useful Improvements in Motor-Driven Lawn Mowers, of which the following is a specification, reference being had to the accompanying drawing, forming a part thereof.

This invention relates to motor driven lawn mowers and the object of the invention is to improve the construction and operation of such lawn mowers in the manner to be hereinafter described and claimed.

Referring to the drawings which accompany this specification and form a part hereof, which drawings illustrate an embodiment of this invention, and on which drawings the same reference characters are employed to designate the same parts wherever they may appear in each of the several views, Fig. 1 is a rear elevation of the lawn mower, a part of the handle being broken away; Fig. 2 is a section on the line 2—2 on Fig. 1, looking in the direction indicated by the arrows, a part of a yoke member being broken away; Fig. 3 is a section of parts of the lawn mower, parts being broken away, the section being taken approximately on the line 3—3 on Fig. 2, looking in the direction indicated by the arrows; Fig. 4 is a vertical section taken on the line 4—4 on Fig. 1, looking in the direction indicated by the arrows, parts being broken away; Fig. 5 is a section taken on line 5—5 on Fig. 4, looking in the direction indicated by the arrows; and Fig. 6 is a section taken on the line 6—6 on Fig. 5, looking in the direction indicated by the arrows.

Referring to the drawings, the reference numerals 1 and 2 designate ground wheels loosely mounted on a shaft 3. An adjustable roller 4 regulates the height of the cut and forms an additional support for the lawn mower in the ordinary manner, as will be readily understood. A handle 5 is connected by yoke members 6 and 7 with parts of the lawn mower. The cutting reel shaft 8 with its spiders 9 and 10 and reel knives 11 which co-operate with the knife 12 in the ordinary manner require no special description except as hereinafter fully set forth. The shaft 3 is journaled in and supports what may be termed a main frame 13 which may be constructed in any suitable or preferred manner. This main frame 13 is partly supported by the roller 4 and forms a support for parts of the lawn mower, and the yoke members 6 and 7 are connected with it. The main frame 13 supports a motor 14 and a magneto 15. The motor illustrated is of the internal combustion type with a crank case 16, cylinder 17, shaft 18, flywheels 19 and 20, fuel tank 21, carburetor 22, sparkplug 23, exhaust 24, and a partial casing 25 to increase the circulation of air over the ribs 26 on the cylinder 17. The armature of the magneto 15 is rotated by the shaft 18 of the motor 14 as clearly shown by Fig. 1 of the drawings.

The motor shaft 18 has a pinion 27 secured thereto which meshes with a gear 28, and the gear 28 meshes with a reel gear 29 which has a hollow hub 30 through which the reel shaft 8 extends to operate a clutch in a manner to be hereinafter described. The gear 28 has a gear 31 fast thereto and the gears 28 and 31 are revolubly mounted on a fixed shaft 32. The gear 31 is in mesh with a gear 33 which is loosely mounted by its hub 34 upon the shaft 3. The gear 33 is provided with a spider construction 35 for holding radially movable clutch members 36 and 37. A rod 38, which is provided with a fork 39, can move a collar 40 to the right or left on the hub 34, see Fig. 5 of the drawings, to move the lower ends of the pressure members in to set the clutch or out to free or release the clutch in a manner which will be readily understood from an inspection of Fig. 5 of the drawings. These pressure members 41 and 42 are illustrated by the drawings as extending through apertures in the spider construction so that they can force the clutch members 36 and 37 against the inside of a clutch ring 43 which is formed as a part of a member 44 which is secured to the shaft 3 by a key 45, for example, and which has a driving ring 46 which is provided on its interior with V-shaped teeth 47. Pawls 48 and 49 are pivotally engaged in recesses 50 on the inside of the hub of the ground wheel 2 and extend rearwardly, referring to the top of the wheel, and are yieldingly held in engagement with the teeth 47 by springs 51 and 52. The ground wheel 1 is provided with a similarly constructed inside hub with pawls and springs and a similar driving ring 53, secured to the shaft 3, drives the ground wheel 1. It will be readily seen that when the shaft 3 is rotated in the direction to propel the lawn mower forward, the wheels 1 and 2 are driven by the driving rings through the pawls, but that either wheel 1 or 2, or both of the wheels, can be rotated faster than they are being rotated by the motor, so that the lawn mower can be easily steered or turned around. The clutch rod 38 may be manipulated by a rod 80 extending up alongside the handle 5 and connected with the rod 38 by a bell-crank lever, not shown.

The reel shaft 8 is movable longitudinally, as well as rotatably, in bearings 54 and 55 to clutch it to or to unclutch it from the reel gear 29. A shifting fork 56 is pivoted to the main frame 13 by a bolt 57 and the upper end of the shifting fork has an elongated aperture 58 for a crank pin 59 on a rock shaft 60 which is provided with a crank arm 61 conveniently situated for actuation by a foot of the operator. The shifting fork 56 is positioned between collars 62 and 63 on the reduced end of the reel shaft 8 and a pin 64 takes the thrust in one direction. An expansible clutch 65 is supported by the other end of the reel shaft 8 and is keyed thereto by the key 66 and is pinned thereon by the pin 67. The clutch 65 is expanded yieldingly against the inner face of the gear 29 by members including a pressure creating member 68 which bears against a block 69 which bears against a spring 70. The reel shaft 8 is yieldingly clutched to the reel gear 29 by moving the reel shaft 8 to the left into the position shown by Fig. 3 of the drawings so that the pressure creating member 68 extends substantially radially from the reel shaft. To release the clutch, the reel shaft 8 is moved to the right, Fig. 3 of the drawings, which moves the shaft end of the pressure creating member 68 to the right, leaving the pressure creating member in an inclined position. The spring 70 should exert sufficient pressure to clutch the reel shaft 8 to the reel gear 29 for cutting grass, but should be weak enough to yield if a twig or stone or other harmful substance should be caught between a reel knife 11 and the stationary knife 12.

The operation of the lawn mower will be readily understood from the foregoing description of its construction and from an inspection of the drawings. The lawn mower can be propelled in the forward direction as the ground wheels are free to revolve and the pawls 48 and 49 will pass over the teeth 47 on the driving rings 46 and 53, this construction being a pawl and ratchet mechanism. One ground wheel can also move faster than another as the two pawl and ratchet mechanisms form a differential mechanism to provide for independent or differential movements of the ground wheels. As the ground wheels are rotated by the motor through the driving rings 46 and 53, the ground wheels can be moved in the forward direction, together or independently, faster than they are being rotated by the motor. Consequently the lawn mower may be readily turned or steered to either side. Moreover, the reel shaft and the reel knives will not be revolved when the mower is propelled forward by hand. When the clutch members 36 and 37 are released from the clutch ring 43, the lawn mower can be propelled backwardly without moving the reel shaft or the piston of the motor or the gears. After the motor is started, the clutch members 36 and 37 can be engaged with the clutch ring 43 by manipulating the rod 80; the ground wheels will then be rotated by the motor and the lawn mower will be propelled by the motor in the forward direction. By moving the reel shaft 8 to the left by means of the crank arm 61 into the position shown by Fig. 3 of the drawings, if it was not in that position before the motor was started, the clutch 65 will be expanded to engage the reel gear 29, and the reel shaft 8 and its knives 11 will be revolved to cut grass against the fixed knife 12. Should a twig or stone, or other obstructing object, be caught between a reel knife 11 and the fixed knife 12, the spring 70 will yield and permit the reel gear 29 to be rotated without rotating the reel shaft 8.

It will be readily seen that the lawn mower can be propelled in the forward direction either by power or by hand; that it can be propelled in the backward direction by hand whether the motor is in operation or not; that the reel shaft and its knives will not revolve or rotate unless connected with the motor; and that the lawn mower can be turned or steered as though the motor were not incorporated in the construction.

The specific construction illustrated and described is an embodiment of the invention and I do not intend the invention to be limited to the construction illustrated and described in all particulars as it is evident that the construction can be changed in some particulars without changing the essential elements of the construction or its principles of operation.

What is claimed is:

1. The combination with the ground wheels of a lawn mower, of a motor, and propelling connections between the motor and both ground wheels for rotating the ground wheels in a forwardly moving direction with uniform velocity over the ground, said propelling connections including separate pawls for each ground wheel for transmitting power from the motor thereto, the pawls being so arranged as to permit either or both of the ground wheels to be rotated in a forwardly moving direction at greater velocity than the velocity being imparted thereto by the motor.

2. The combination with the cutting reel shaft of a lawn mower, of a motor, driving connections between the motor and the cutting reel shaft, and means actuated by longitudinal movements of the cutting reel shaft for connecting the cutting reel shaft with the motor or disconnecting it therefrom.

3. The combination with the cutting reel shaft of a lawn mower, of a motor, driving connections between the cutting reel shaft and the motor, including friction clutch mechanism operable by longitudinal movements of the cutting reel shaft, and means for moving the cutting reel shaft longitudinally.

4. The combination in a lawn mower of a motor, a motor shaft, a ground wheel shaft, two ground wheels loosely mounted for rotation on the ground wheel shaft, a cutting reel shaft, power transmitting means loosely mounted for rotation upon the ground wheel shaft, power transmitting means loosely mounted for rotation upon the cutting reel shaft, power transmitting connections between the motor shaft and said power transmitting means, clutch mechanism actuatable by longitudinal movements of the cutting reel shaft to connect the cutting reel shaft with the power transmitting means or to disconnect it therefrom, pawls mounted on the ground wheels to rotate them in a forwardly moving direction, means to drive the pawls in one direction, and a clutch to disconnect the means to drive the pawls in one direction from the motor or to clutch said means to the motor.

In witness whereof I hereto affix my signature.

ALBERT J. DREMEL.